United States Patent [19]

Thom

[11] 3,979,617
[45] Sept. 7, 1976

[54] ELECTRICAL ROTARY SPEED SIGNAL GENERATOR

[75] Inventor: Dieter-Helmut Thom, Ketsch, Germany

[73] Assignee: Teldix GmbH, Heidelberg, Germany

[22] Filed: Sept. 2, 1975

[21] Appl. No.: 609,513

[30] Foreign Application Priority Data
Sept. 13, 1974 Germany............................ 2443862

[52] U.S. Cl. ................................................. 310/168
[51] Int. Cl.² ......................................... H02K 21/26
[58] Field of Search ............................ 310/152–170, 310/43, 90

[56] References Cited
UNITED STATES PATENTS

| | | |
|---|---|---|
| 3,252,024 | 5/1966 | Loudon................................ 310/155 |
| 3,772,547 | 11/1973 | Abate .................................. 310/168 |
| 3,793,545 | 2/1974 | Leiber et al. ....................... 310/168 |
| 3,876,927 | 4/1975 | Gee et al. ....................... 310/155 X |
| 3,911,302 | 10/1975 | De Claire............................ 310/168 |

*Primary Examiner*—Donovan F. Duggan
*Attorney, Agent, or Firm*—Spencer & Kaye

[57] ABSTRACT

An electrical rotary speed signal generator comprising a rotor mounted on a rotary component and a stator mounted opposite part of the rotor on a stationary component, the stator producing a signal representative of the rotational speed of the rotor by sensing the latter, a non-metallic housing for the stator and at least two metallic bearing bodies on the housing, at least one of which bearing bodies is radially elastically flexible, the bearing bodies being adapted to engage the wall of a bore in the stationary component in which the stator is positioned.

11 Claims, 5 Drawing Figures

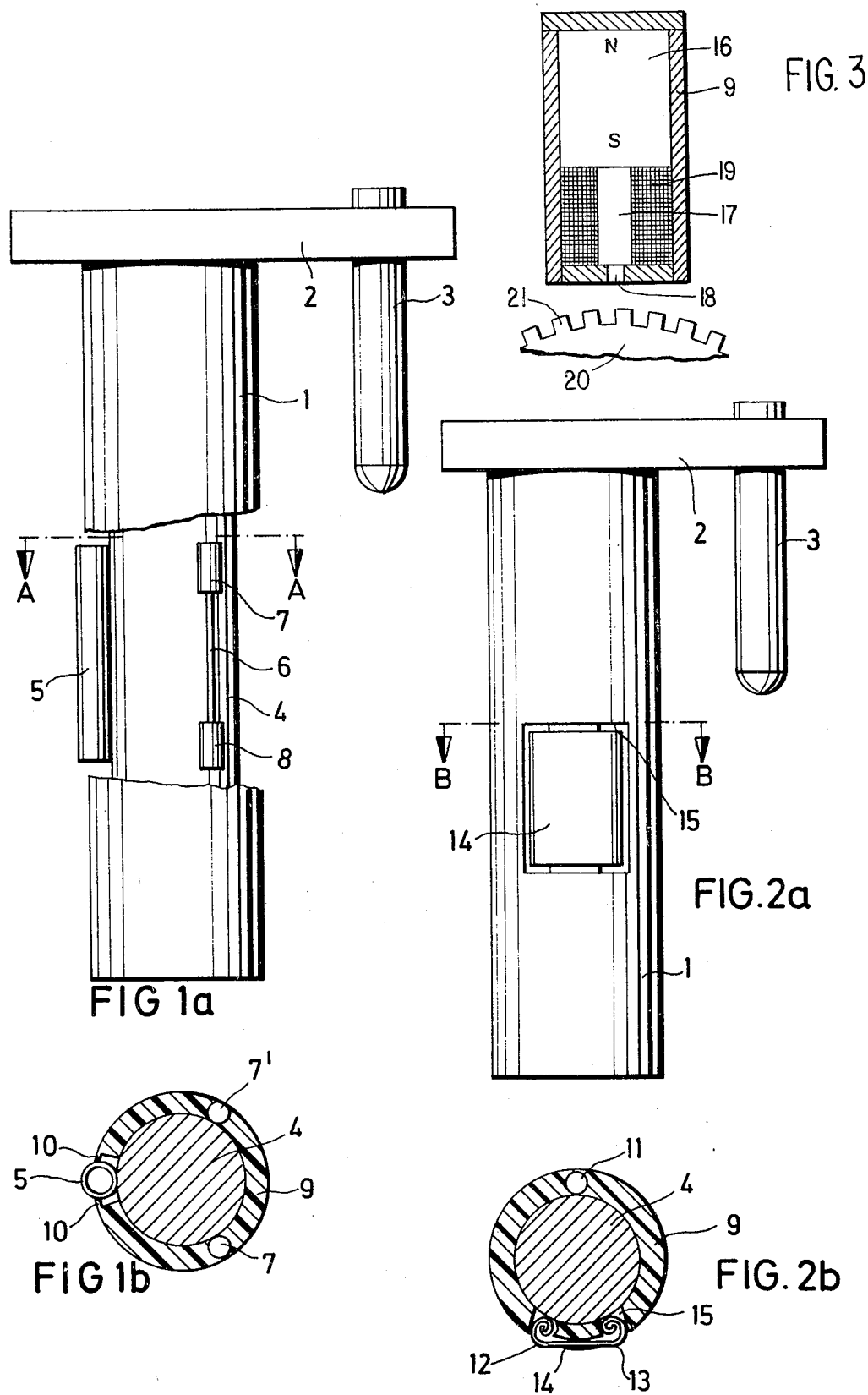

ELECTRICAL ROTARY SPEED SIGNAL GENERATOR

BACKGROUND OF THE INVENTION

The invention relates to an electrical rotary speed generator for producing an electrical signal, which provides a signal representative of the angular speed between two components rotating relative to each other. Such a generator has been described in our U.S. Pat. No. 3,793,545 in which a rotor is arranged on a rotating component and provided with equispaced recesses or teeth and a stator displaceably held on the stationary component by means of elastic clamping bodies, which stator extends only over a small angular region of the rotor and has its pole facing opposite the rotor recesses. The rotor and stator are provided with sliding surfaces, which permit a harmless contact between rotor and stator, so that, after setting the stator to a minimum air gap on assembly, radial relative movements of the components with respect to each other cause a displacement of the stator in a direction to enlarge the air gap after frictional adhesion of the stator to its mounting is overcome.

The invention in this Prior Patent is based on the knowledge that if the air gap of such a signal generator is merely determined by the relative movements of the components with respect to each other, it is still adequately small, but, however, a further enlargement of the air gap caused by tolerances is not admissible.

For this purpose the stator is so constructed that, on the assembly the air gap with regard to the sliding surfaces is automatically zero, and thus stator and rotor abut each other. However, on the other hand, the stator is so flexibly arranged that clamping is avoided. However, this flexibility is not an elastic flexibility but a flexibility in the sense of a frictional adhesion so that the rotor creates only as much space as it requires for its rotation and the stator remains in the position into which it was displaced.

Thus it is characteristic of the rotary speed signal generator of the Prior Patent that the variations of the magnetic air gap are caused by wheel bearing play movements. In operation after the respective positions of rotor and stator have been determined by the rotor, the stator is located stationarily on the non-rotatable component adjacent to the rotor, which is firmly connected to the rotatable component, so that sprung or loose coupling elements for the stator are not necessary.

If the housing of the stator of such a signal generator is proposed to be made of plastics material and is inserted in a bore of the stationary component, than it is possible — because of the different function of temperature of the plastics material and the material of the stationary component — that the stator will be firmly seated in its bore and can no longer be displaced. Therefore with relative movements of the components towards each other, destruction of the signal generator follows, since the stator can no longer be displaced. On the other hand, a large amount of play cannot be permitted between the stator and the wall of the bore, since the stator must be exactly guided through the bore in order to avoid erroneous signals.

SUMMARY OF THE INVENTION

It is an object of the invention to so construct the stator of the signal generator that. on the one hand, the stator is exactly guided but, on the other hand, any sticking of the stator because of temperature influences is prevented.

According to the invention, there is provided an electrical rotary speed signal generator for producing an electrical signal which represents the angular speed of two components, one of which is rotatable with respect to the other, said generator comprising a rotor for mounting on the rotary component, a stator for mounting on the stationary component opposite a part of said rotor, means in said stator for detecting rotary movement of said rotor and for providing an output signal representative of the angular speed thereof, a non-metallic housing for said stator for insertion with said stator into a bore in the stationary component and at least two peripherally spaced high strength bearing bodies for said non metallic housing adapted for engagement with the wall of the bore in the stationary component with at least one of said two bearing bodies being radially elastically flexible for producing frictional adhesion between said stator and said bore.

BRIEF DESCRIPTION OF THE DRAWINGS

The invention will now be described in greater detail, by way of example, with reference to the drawings, in which:

FIG. 1a shows the side view of a first form of embodiment of the stator constructed in accordance with the invention;

FIG. 1b shows a cross section taken on the line A—A of FIG. 1a;

FIG. 2a shows a second embodiment in side view, and

FIG. 2b shows a cross-section taken on the line B—B of FIG. 2a.

FIG. 3 shows schematically the rotary speed generator.

DESCRIPTION OF THE PREFERRED EMBODIMENTS

According to a preferred embodiment, the invention basically proposes, in an electrical rotary speed generator with a rotor which generates a speed signal in the stator as it passes it, such as that described in our prior U.S. Pat. No. 3,793,545, and described in connection with FIG. 3, that, with a non metallic stator housing, the diameter of the stator relative to the opening accommodating it in the stationary component is somewhat smaller and that at least two, preferably three, bearing bodies of high strength, particularly of metal, are provided distributed around the periphery of the stator for the support of the stator in the opening, at least one of these bearing bodies being constructed to be elastically flexible in the radial direction.

The support of the stator in the opening is thus no longer carried out by the stator housing, but by at least two preferably three, bearing bodies, of which at least one is elastic in the radial direction so that any sticking of the stator is no longer possible.

In principle, merely a separate bearing body, which is elastic, would be all that is necessary to achieve the guidance, but, however, when using a plastics surface as counter support, the ductility of the plastics has to be taken into account.

It is therefore necessary to let into the plastics housing bearing bodies with adequate strength, particularly of metal, which are supported at the actual stator body.

Each of the non-flexible bearing body can in this case be constructed as a metal pin, which is let into the housing. It can, for example, be integrally injection-moulded into the housing and so dimensioned that the pin seals flush with the surface of the housing. Instead of the pin, a body can be used which comprises two thickened parts at each end joined by a connecting pin or web, wherein the two thickened parts form two bearing points displaced in the axial direction; however, with regard to the three bearing bodies to be located on the periphery, the two thickened parts represent one bearing body. Also the thickened parts can be replaced by two balls.

The elastic bearing body or bodies can be constructed as metal tubes, which are accommodated in a recess of the stator housing, wherein, to achieve the desired guidance, the diameter of each metal tube is somewhat greater than the depth of its recess in the housing, so that the tube must be elastically deformed to a small extent when being introduced into the bore in the stationary component. At the same time, the clamping effect, by which the desired frictional adhesion occurs, is achieved as a result of this deformation.

In accordance with another preferred embodiment, two bearing bodies are made elastic, wherein, however, these elastic bearings are formed by a single component. For this purpose a small metal band is coiled up at two opposite ends. The coiled-up ends act as springs and are inserted in recesses in the housing wall, wherein parts of the coiled-up ends projecting beyond the housing surface to form bearing points. The centre part of the plate between the coiled ends in this case is located radially inwardly as compared to the coiled ends. In particular, this connection web may be in a recess in the housing.

Signal generators as above described should be particularly suitable for the measurement of the speed of a vehicle wheel.

Referring now to the drawings, FIG. 1a shows, in side elevation, a stator of a signal generator constructed in accordance with the invention, the stator comprises a body 1 for insertion into a bore in the stationary component. It has, at the lower end, a pole-pin (not shown) and contains a magnet as well as a winding. It also has a head 2, a pin 3 secured thereon as well as a connection cable, (not shown). The pin 3 is inserted into a further bore in the stationary component and serves as an anti-rotation device for the stator. The pin can also be firmly secured in the stationary component; then the head 2 merely has a corresponding bore to receive the pin.

The cylindrical body 1 is shown without the plastics housing 9 in its central part. Thus the inner core 4, for example, the magnet, is visible here as well as two bodies 5 and 6 to 8 abutting against these magnets and serving as bearing bodies. The third body 6' to 8', serving as bearing body, is not visible in FIG. 1a.

FIG. 1b shows a section along the line A—A of FIG. 1a. The position of the three bearing bodies can be seen here. The bodies 6 to 8 and 6' to 8' are so embedded in the plastics housing 9 of the stator that their surface is flush with the housing surface. The individual bearing points are here formed by the two axially displaced thickened parts 7 and 8 or 7' and 8', whereas the connecting web 6 or 6' serves particularly for the satisfactory securing of the body in the plastics material. These bearing points are made non-elastic. On the other hand, the body 5 is constructed as a tube, which is likewise supported on the core 4 and has such a diameter that it normally projects beyond the plastics housing. The body 5 is, as shown in FIG. 1b, so accommodated in a recess of the housing wall 9, that it has a certain freedom of movement and can be elastically deformed. However, the housing 9 has lugs 10, which prevent the tube 5 from falling out of the recess. The tube 5 is elastically deformed when the stator is introduced into the opening in the stationary component. In this case the tube abuts against the wall of the bore and thus causes, together with the bearing points of the other bearing bodies, a location of the stator in the bore in the axial and radial direction. A displacement in the axial direction is possible only when a considerable frictional adhesion is overcome because of the spring effect of the tube 5. If, in this case, for tolerance reasons, a plastics deformation should also occur, this is harmless.

FIG. 2a shows a further embodiment of the invention. As follows from FIG. 2b, which shows a section along the line B—B of FIG. 2a, here a non-elastic bearing body 11, which can be constructed correspondingly to the bearing bodies 6 to 8 of FIG. 1a, and two elastic bearing points 12 and 13 are provided. The latter are formed by a metal plate 14, which is coiled spirally at opposite ends. These spirals are supported against the core 4 and are inserted in recesses 15, thus formed, of the housing 9, such that, on introduction, they are notched in, and are then connected undetachably to the stator. The diameters of the spirals are such that the bearing points 12 and 13 project out of the housing 9 without any force effect; the centre part of the plate connecting the spirals lies in a further flat recess of the housing 9 and does not contribute anything to the bearing. Here the spirals, acting as springs, serve as elastic bearing bodies, which produce the frictional adhesion.

In FIG. 3 is schematically shown the construction of a usual speed generator; also the generator according to the invention may be constructed similarly.

In FIG. 3 there is a magnet 16, a pole-piece 17 with the pole top 18 and a winding 19, shown within the stator housing 9, the output signal of the winding varies with variations of the magnetic field in the pole-piece 17. Variations of this magnetic field occur when the rotor 20 with its teeth 21 is turned.

It will be understood that the above description of the present invention is susceptible to various modification changes and adaptations.

What is claimed is:

1. An electrical rotary speed signal generator for producing an electrical signal which represents the angular speed of two components, one of which is rotatable with respect to the other, said generator comprising a rotor for mounting on the rotary component, a stator for mounting on the stationary component opposite a part of said rotor, means in said stator for detecting rotary movement of said rotor and for providing an output signal representative of the angular speed thereof, a non-metallic housing for said stator for insertion with said stator into a bore in the stationary component and at least two peripherally spaced high strength bearing bodies for said non metallic housing adapted for engagement with the wall of the bore in the stationary component with at least one of said two bearing bodies being radially elastically flexible for producing frictional adhesion between said stator and said bore.

2. A generator as defined in claim 1, and comprising a further bearing body peripherally spaced from said two bearing bodies.

3. A generator as defined in claim 1, wherein said bearing bodies are metal.

4. A generator as defined in claim 2, wherein said further bearing body is radially elastically flexible.

5. A generator as defined in claim 1, wherein at least one of said bearing bodies is non-flexible and comprise a pin.

6. A generator as defined in claim 1, wherein at least one of said bearing bodies is non-flexible and each said non-flexible bearing body is let into said stator housing.

7. A generator as defined in claim 6, wherein each said non-flexible bearing body is flush with the surface of said housing.

8. A generator as defined in claim 6, wherein each said non-flexible bearing body comprises two axially displaced thickened parts which together form bearing points and a thinner connecting web.

9. A generator as defined in claim 1, wherein each said radially elastically flexible bearing body comprises a metal tube accommodated in a recess defined by said stator housing and of larger diameter than the depth of said recess.

10. A generator as defined in claim 2, wherein two of said bearing bodies are radially elastically flexible bearing bodies and comprise a metal plate coiled up at two opposite ends to act as springs with said two opposite ends inserted into notches in the wall of said housing with projecting parts forming bearing points.

11. A generator as defined in claim 10, and comprising a recess defined by said housing in which the part of said metal plate between the coiled-up ends lies.

* * * * *